(12) United States Patent
Thorne et al.

(10) Patent No.: US 9,519,292 B2
(45) Date of Patent: Dec. 13, 2016

(54) HIGH PRESSURE VALVE ASSEMBLY

(71) Applicant: Senior IP GmbH, Schaffhausen (CH)

(72) Inventors: Robert M Thorne, Franklin, MA (US);
Peter A Jordan, Harrisville, RI (US);
Patrick B Reed, Franklin, MA (US)

(73) Assignee: Senior IP GmbH, Schaffhausen (CH)

( * ) Notice: Subject to any disclaimer, the term of this patent is extended or adjusted under 35 U.S.C. 154(b) by 182 days.

(21) Appl. No.: 14/201,474

(22) Filed: Mar. 7, 2014

(65) Prior Publication Data

US 2015/0253785 A1    Sep. 10, 2015

(51) Int. Cl.
*F04F 1/08* (2006.01)
*G05D 16/06* (2006.01)
*E21B 43/12* (2006.01)

(52) U.S. Cl.
CPC ......... *G05D 16/0616* (2013.01); *E21B 43/123* (2013.01); *Y10T 137/7836* (2015.04)

(58) Field of Classification Search
CPC .............. E21B 43/123; Y10T 137/2934; F16K 31/126; G05D 16/0616
USPC ........ 137/155; 166/316, 324, 325, 326, 372, 166/373, 374; 251/45, 46, 335.3
See application file for complete search history.

(56) References Cited

U.S. PATENT DOCUMENTS

| | | |
|---|---|---|
| 2,761,465 A | 7/1956 | Garrett et al. |
| 2,880,620 A | 4/1959 | Bredtschneider |
| 3,124,151 A * | 3/1964 | Lilly ...................... E21B 43/123 137/155 |
| 3,208,398 A * | 9/1965 | Douglas ................ E21B 43/123 137/155 |
| 3,802,504 A | 4/1974 | Garrett |

(Continued)

FOREIGN PATENT DOCUMENTS

| | | |
|---|---|---|
| CN | 102588625 A | 7/2012 |
| EP | 2167788 B1 | 8/2011 |

(Continued)

OTHER PUBLICATIONS

PB Type Subsurface Controlled Safety Valve, Weatherford Artificial Lift Systems, Brochure, 11 Pages, Kirkhill Drive, Kirkhill Industrial Estate, DYCE, Aberdeen AB21 0EU.

(Continued)

*Primary Examiner* — Mary McManmon
*Assistant Examiner* — Reinaldo Sanchez-Medina
(74) *Attorney, Agent, or Firm* — Richard D. Harris; Greenberg Traurig, LLP (57) ABSTRACT

A valve assembly for high pressure applications includes a pre-charge chamber, at least one inlet for pressurized gas to enter the assembly, a system poppet and an outlet for releasing pressurized gas into a desired environment. Pressurized gas can flow through access channels into a single bellows, which expands to move a shaft connected to the system poppet to open the poppet. In another embodiment, the pre-charge chamber compresses a first bellows to expand a second bellows, and vice versa upon reciprocation. The two bellows are hydraulically connected and filled with incompressible fluid. Each bellows has an internal limiting valve to retain incompressible fluid therewithin, and to preclude the complete nesting of either of the bellows. The retained fluid within the bellows maintains an internal pressure to minimize differential pressure, thereby minimizing the risk of bellows failure.

19 Claims, 7 Drawing Sheets

(56) References Cited

U.S. PATENT DOCUMENTS

| | | | |
|---|---|---|---|
| 3,827,501 A | 8/1974 | Johnson et al. | |
| 3,834,414 A * | 9/1974 | McMurry | E21B 43/123 137/155 |
| 3,842,861 A * | 10/1974 | Jandrasi | F16K 3/10 137/613 |
| 3,980,135 A | 9/1976 | Garrett | |
| 4,151,857 A | 5/1979 | DeMoss et al. | |
| 4,239,082 A * | 12/1980 | Terral | E21B 23/03 137/155 |
| 4,625,941 A | 12/1986 | Johnson | |
| 5,662,335 A | 9/1997 | Larsen | |
| 6,827,146 B2 | 12/2004 | Faustinelli | |
| 8,701,779 B2 | 4/2014 | Kleppa et al. | |
| 9,010,353 B2 * | 4/2015 | Salihbegovic | E21B 43/123 137/155 |
| 2004/0182437 A1 | 9/2004 | Messick | |
| 2010/0096142 A1 | 4/2010 | Randazzo | |
| 2010/0155079 A1 | 6/2010 | Stokka et al. | |
| 2011/0067879 A1 | 3/2011 | Kleppa et al. | |
| 2012/0204977 A1 | 8/2012 | Lembcke | |
| 2013/0032226 A1 | 2/2013 | Salihbegovic | |
| 2013/0312833 A1 | 11/2013 | Salihbegovic | |
| 2014/0069659 A1 * | 3/2014 | Wang | E21B 43/123 166/373 |

FOREIGN PATENT DOCUMENTS

| | | |
|---|---|---|
| JP | H04181066 A | 6/1992 |
| WO | 8401609 A1 | 4/1984 |
| WO | 2008150179 A1 | 12/2008 |
| WO | 2009113875 A2 | 9/2009 |
| WO | 2011102732 A2 | 8/2011 |
| WO | 2011102732 A3 | 8/2011 |

OTHER PUBLICATIONS

ISR issued on PCT/IB2015/057647, mailed Jan. 1, 2016, 2 pages.
ISR issued on PCT/IB2015/058195, mailed Mar. 23, 2016, 4 pages.
Written Opinion of the International Searching Authority on PCT/IB2015/058195, mailed Mar. 23, 2016, 9 pages.

* cited by examiner

HIGH PRESSURE VALVE ASSEMBLY

FIELD OF THE DISCLOSURE

The present invention relates to valve assemblies for high pressure fluid applications, and in particular, to valve assemblies having one or more bellows for regulating the pressure of a flowing gas.

BACKGROUND

Valves are known to be useful for regulating the flow of fluids. Moreover, compressible and expandable bellows structures have been known to be useful for controlling pressurized fluids to better regulate such valves. In the context of high pressure applications, bellows can be used to control the opening and closing of valves to regulate the flow of fluids through valves, while minimizing the risk of valve failure. However, bellows themselves can also be subject to failure in high pressure conditions.

A standard edge-welded bellows having spherical welds is typically comprised of metal plates welded together, where the thickness of the plates often measures between one and twenty thousandths of an inch. More often, the thickness of such plates is typically between three and five thousandths of an inch. Such standard edge-welded bellows can typically last up to a minimum of 10,000 cycles at a relatively low pressure of 100 pounds per square inch (psi). At higher pressures registering in thousands of psi, such standard edge-welded bellows can fracture, as a result of fatigue or high stress, so as to render them incapable of reaching such cycle objectives.

There is also a tradeoff between the thickness of a bellow's plates and the stress caused by that bellow's deflection. The bending stress of a bellow's deflection can be decreased by reducing the thickness of the bellow's plates. On the other hand, the plates must be thick enough to withstand the pressure differential across the bellows. High differential pressures across the surfaces of the plates within a bellows can cause failure because edge-welded bellows plates are fairly thin, typically less than one one-hundredth of an inch in thickness.

As valve and bellows technology has improved, it has become increasingly important to create valve assemblies capable of withstanding pressures in excess of 5,000 psi. Indeed, several practical applications have arisen generating the need for valve assemblies in which very high fluid pressure is utilized to open or close the valve. For example, one type of valve assembly that must withstand increasingly high pressure are gas lift valves, which are traditionally used in oil wells to aerate crude oil, thereby decreasing the weight of such oil and easing its extraction. Standard gas lift valves are well known in the art, and have been described in detail, for example, in U.S. application Ser. No. 13/195,468, assigned to Weatherford/Lamb, Inc., published as U.S. Pat. App. Pub. No. 2013/0032226 A1 (the "'468 application"), the entirety of which is incorporated herein by reference. Various other gas lift applications, in which bellows-type valve structures are described, include U.S. Pat. No. 6,827,146, as well as U.S. application Ser. Nos. 10/393,558, 12/603,383, and 13/900,114, which were published as U.S. Pat. App. Pub. Nos. 2004/0182243 A1, 2010/0096142 A1, and 2013/0312833, respectively.

FIG. 1 of the '468 application demonstrates how gas lift valves 40 are typically housed within side pocket mandrels 30 spaced along the production string 20. ('468 application, at ¶ [0003]-[0004].) The '468 application notes that conventional gas lift valves are incapable of operating under pressures in excess of 2,000 psi, even though, as described therewithin, gas lift system operators sought systems capable of operating in pressures of up to 5,000 to 6,000 psi. ('468 application, at ¶ [0013].) The continuous extraction of oil worldwide has begun to deplete oil resources, with much of the "low hanging fruit" having already been extracted. Therefore, oil wells are now located at greater depths than ever before, and extracting that oil at such greater depths, particularly in the context of deep water offshore drilling, requires that valves be capable of withstanding enormous amounts of pressure—even greater than those stated in the '468 application.

It is believed that the ideal valve assembly for gas lift valves for current needs should be capable of withstanding up to 10,000 psi or greater, while lasting for at least 10,000 cycles. It is further believed that conventional valve assemblies have difficulty in withstanding such pressures, especially withstanding such pressures for such long life cycles.

SUMMARY OF THE INVENTION

In one embodiment of the present invention, a high pressure valve assembly comprises a housing with a proximal end and a distal end; a pre-charge chamber with a first fixed end disposed near the proximal end of the housing, and a second movable end opposite the first fixed end, wherein the pre-charge chamber contains a pressurized pre-charge gas set at a threshold pressure value. A shaft flange is operably connected to the second movable end of the pre-charge chamber, the shaft flange being coupled to a shaft extending from the shaft flange to a system poppet configured to seal an outlet in the distal end of the housing. A bellows structure is operably interposed between the shaft flange and the outlet, the bellows having a movable end operably attached to the shaft flange and a fixed end opposite the movable end, in which the fixed end is operatively coupled to a fixed fitting restrainably affixed along the interior of the housing. The shaft flange passes through the bellows along its longitudinal axis. The valve assembly further includes least one inlet disposed near the distal end of the housing, which enables the introduction of a pressurized intake gas into the housing. This intake gas flows through one or more access channels into the bellows, which expands when the pressure of the pressurized intake gas against the movable end of the bellows overcomes the threshold pressure value of the pre-charge chamber. When this occurs, the intake gas pushes the movable end of the bellows towards the proximal end of the housing to, in turn, move both the shaft flange and the shaft towards the proximal end of the housing, thereby opening the system poppet and allowing the pressurized intake gas to exit the housing through the outlet. The bellows returns to its compressed state when the pressure of the pressurized intake gas falls below the threshold pressure value, thereby pushing the movable end of the bellows towards the distal end of the housing. This, in turn, moves both the shaft flange and the shaft towards the distal end of the housing, to close and reseal the system poppet, to prevent the pressurized intake gas from exiting the housing through the outlet.

Preferably, in the present invention, the bellows is an edge-welded bellows, in which the welds of the edge-welded bellows are internal welds, which are substantially rectangular in shape. This structure enables the bellows to form a solid, self-supporting, cylindrical stack when fully nested.

In yet another embodiment of the present invention, the system poppet is operably attached to a coiled spring and the shaft further includes a slot-pin lost-motion mechanism.

In another preferred embodiment of the present invention, a high pressure valve assembly comprises a housing with a proximal end and a distal end, a pre-charge chamber with a first fixed end disposed near the proximal end, and a second movable end opposite the first fixed end. In this preferred embodiment, two bellows structures are utilized: a first bellows includes a movable back end operably coupled to the second movable end of the pre-charge chamber, and a fixed front end opposite the movable back end. The fixed front end is operably coupled to a fixed fitting restrainably positioned within the interior of the housing. A second bellows with a fixed back end is operably coupled to the fixed fitting, and also includes a movable front end opposite the fixed back end. A shaft flange is operably connected to the movable front end of the second bellows, and the shaft flange is coupled by a shaft to a system poppet also configured to seal an outlet in the distal end of the housing. At least one inlet is disposed near the distal end of the housing. As in the first embodiment above, at least one inlet enables a pressurized intake gas to enter the housing and flow through one or more access channels to exert a pressure against the shaft flange, and, in turn, the movable front end of the second bellows. There is also a fluid passage disposed within the fixed fitting. The fluid passage operably connects the first bellows and the second bellows to form a sealed dual bellows chamber defined by the first bellows, the second bellows and the fluid passage. In this preferred embodiment, the first bellows includes a first limiting valve that serves to seal the fluid passage when the first bellows is compressed, and the second bellows likewise includes a second limiting valve, which serves to seal the fluid passage when the second bellows is compressed.

In a further preferred embodiment of the present invention, the first limiting valve limits the compression of the first bellows to a first pre-determined orientation in which the first bellows is not fully nested. In this embodiment, the first limiting valve includes a coiled spring and a slot pin mechanism. In this embodiment also, the second limiting valve likewise limits the compression of the second bellows to a second pre-determined orientation in which the second bellows is not fully nested, and also includes a coiled spring and a slot pin mechanism.

In a further embodiment of the present invention, the sealed dual bellows chamber is substantially filled with a substantially incompressible fluid, and the pre-charge chamber contains a pressurized pre-charge gas set at a threshold pressure value. The pressurized pre-charge gas exerts a compression force against the first bellows, thereby forcing an amount of the incompressible fluid into the second bellows to, in turn, expand the second bellows.

In another preferred embodiment of the present invention, the movable front end of the second bellows expands towards the distal end of the housing to, in turn, move both the shaft flange and the shaft towards the distal end of the housing, thereby closing and resealing the system poppet.

In one embodiment of the present invention, the first limiting valve of the first bellows prevents the complete evacuation of the incompressible fluid from the first bellows, and the second limiting valve of the second bellows prevents the complete evacuation of the incompressible fluid from the second bellows.

In yet another preferred embodiment of the present invention, the incompressible fluid remaining in the first bellows exerts a fluid pressure against the second movable end of the pre-charge chamber, the fluid pressure being substantially equal to the threshold pressure value, creating little to no differential pressure across the first bellows. In another embodiment of the present invention, the second bellows expands when the pressure of the pressurized intake gas bearing against the shaft flange falls below the threshold pressure value of the pre-charge chamber. Conversely, when the pressure of the pressurized intake gas increases and overtakes the threshold pressure value of the pre-charge chamber, the compression of the second bellows opens the first limiting valve and forces an amount of the incompressible fluid into the first bellows, thereby expanding the first bellows by pushing the movable back end of the first bellows towards the proximal end of the housing. This, in turn, moves both the shaft flange and the shaft towards the proximal end of the housing, thereby opening the system poppet and allowing the pressurized intake gas to exit the housing through the outlet.

In a preferred embodiment of the present invention, the incompressible fluid remaining in the second bellows exerts a second fluid pressure against the movable front end of the second bellows, the second fluid pressure being substantially equal to the gas pressure of the pressurized intake gas. The movable front end of the second bellows expands towards the distal end of the housing to, in turn, move both the shaft flange and the shaft towards the distal end of the housing, thereby closing and resealing the system poppet.

In yet another preferred embodiment, the present invention comprises a modular dual bellows assembly for high pressure valve applications, which comprises a housing with a proximal end and a distal end; a first bellows with a movable back end and a fixed front end opposite the movable back end, in which the fixed front end is operably coupled to a fixed fitting restrainably affixed along the interior of the housing; and a second bellows has a fixed back end operably coupled to the fixed fitting, and a movable front end opposite the fixed back end. In this assembly, a fluid passage is disposed within the fixed fitting, the fluid passage operably connecting the first bellows and the second bellows to form a sealed dual bellows chamber defined by the first bellows, the second bellows and the fluid passage. In this embodiment, the first bellows includes a first limiting valve that serves to seal the fluid passage when the first bellows is compressed, and the second bellows likewise includes a second limiting valve that serves to seal the fluid passage when the second bellows is compressed. In this embodiment, the sealed dual bellows chamber is substantially filled with an incompressible fluid.

In yet another preferred embodiment of the present invention, a gas lift valve comprises a housing with a proximal end and a distal end; a pre-charge chamber having a first fixed end disposed near the proximal end and a second movable end opposite the first fixed end. A pre-charge chamber contains a pressurized pre-charge gas set at a threshold pressure value. In this embodiment, a first bellows includes a movable back end operably coupled to the second movable end of the pre-charge chamber, and a fixed front end which is positioned opposite the movable back end. The fixed front end is operably coupled to a fixed fitting restrainably positioned within the interior of the housing. In this embodiment also, a second bellows with a fixed back end is operably coupled to the fixed fitting, and includes a movable front end opposite the fixed back end. A shaft flange is operably connected to the movable front end of the second bellows, the shaft flange being coupled by a shaft to a system poppet configured to seal an outlet in the distal end of the housing. At least one inlet is disposed near the distal end of the housing, at least one inlet enabling a pressurized intake gas to enter the housing and flow through one or more access channels to exert a pressure against the shaft flange, and, in turn, the movable front end of the second bellows. A fluid passage is disposed within the fixed fitting, the fluid passage operably connecting the first bellows and the second bellows to form a sealed dual bellows chamber defined by the first bellows, the second bellows and the fluid passage. The first bellows includes a first limiting valve that serves to seal the fluid passage when the first bellows is compressed, and the second bellows includes a second limiting valve that serves to seal the fluid passage when the second bellows is compressed.

DETAILED DESCRIPTION

Reference will now be made in detail to the preferred embodiments of the invention, examples of which are illustrated in the accompanying drawings. While the invention will be described in conjunction with the preferred embodiments, the invention is intended to cover alternatives, modifications and equivalents, which may be included within the spirit and scope of the invention as defined by the claims. Furthermore, in the detailed description of the present invention, several specific details are set forth in order to provide a thorough understanding of the present invention. However, one of ordinary skill in the art will appreciate that the present invention may be practiced without these specific details. Thus, while the invention is susceptible to embodiment in many different forms, the subsequent description of the present disclosure should be considered as an exemplification of the principles of the invention, and is not intended to limit the invention to the embodiments so illustrated.

Figure 1:
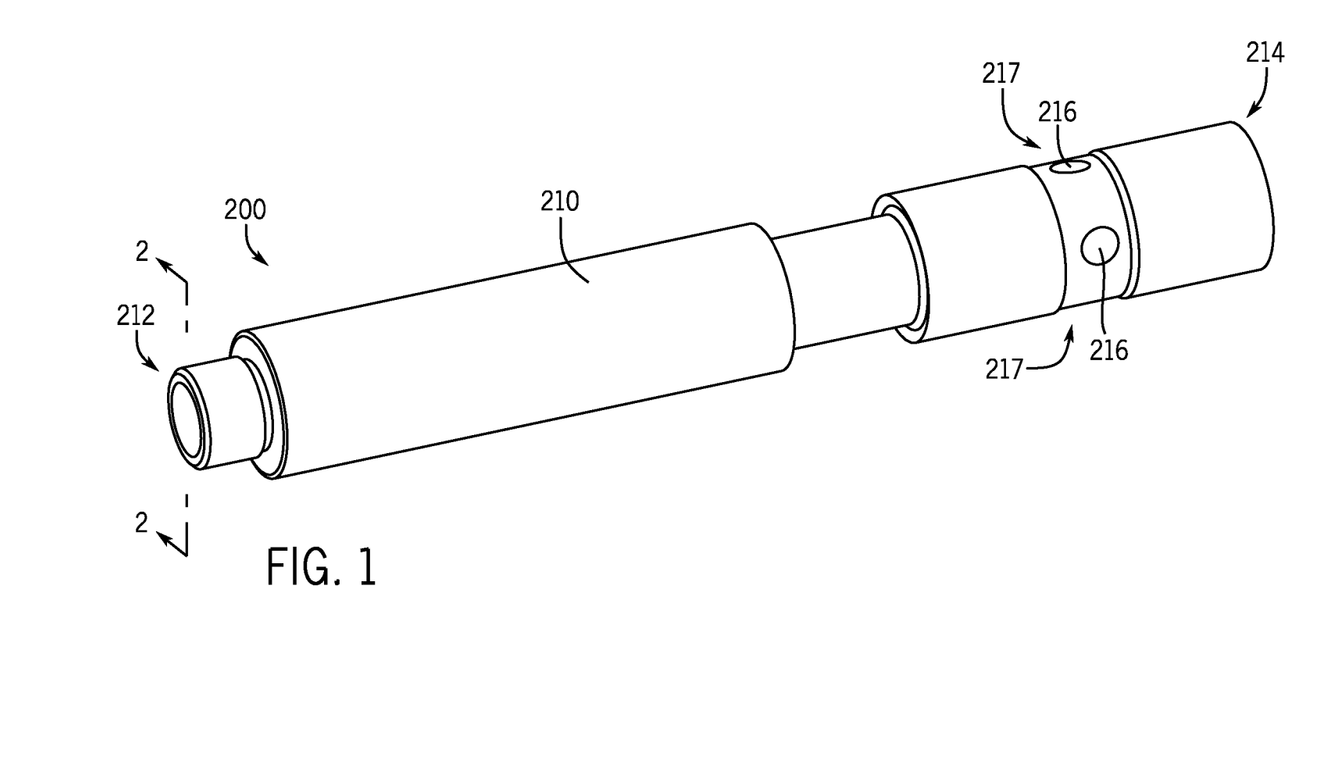
FIG. 1 is a perspective view of a high pressure valve assembly according to a first embodiment of the invention, using a single bellows.

FIG. 1 depicts high pressure valve assembly 200 according to a first embodiment of the invention. High pressure valve assembly 200 includes housing 210 having proximal end 212 and distal end 214. Housing 210 also includes a series of circumferential inlets 216, as well as external gas outlet 219.

Figure 2:
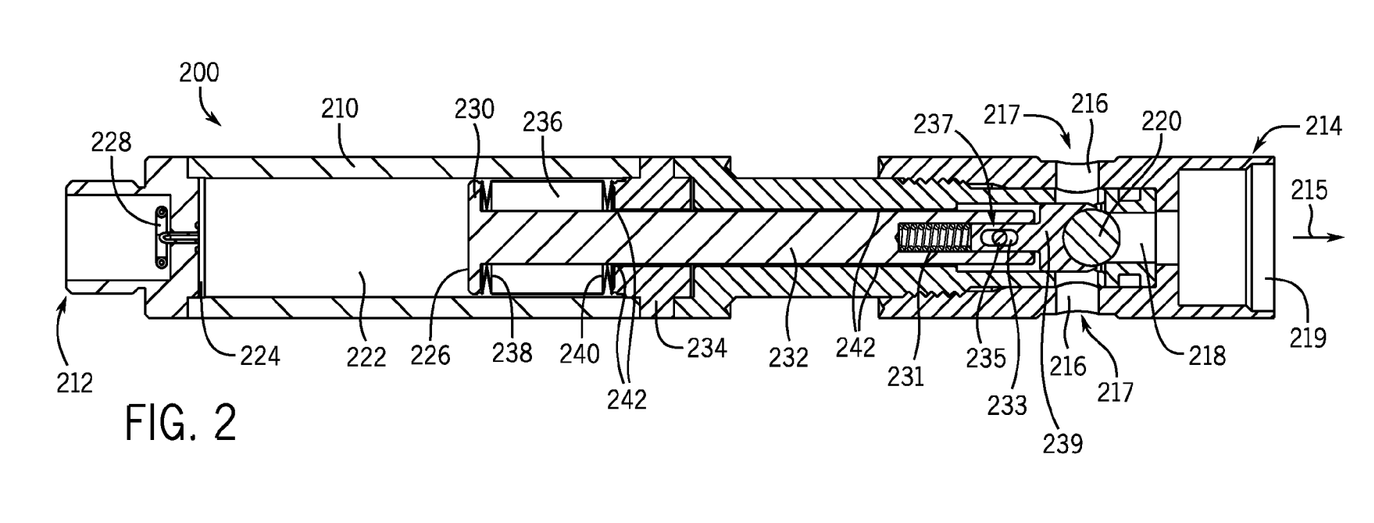
FIG. 2 is an elevated cross-sectional view of a high pressure valve assembly according to FIG. 1, taken along line 2-2 and looking in the direction of the arrows.
Figure 3:
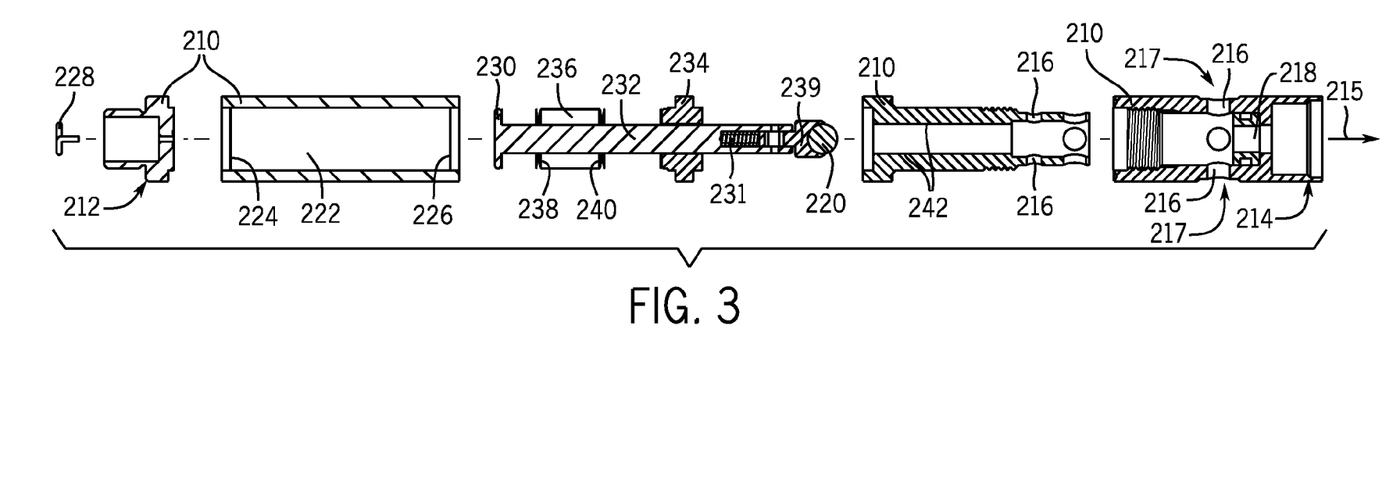
FIG. 3 is an exploded view of the high pressure valve assembly shown in FIG. 2.

Referring now to FIGS. 2 and 3, a cross-sectional view of high pressure valve assembly 200 is depicted. Valve assembly 200 comprises housing 210 having proximal end 212 and distal end 214. Valve assembly 200 is configured to regulate the flow of fluid emanating from outside housing 210, in the environment in which high pressure valve assembly 200 is positioned, which fluid enters housing 210 through one or more inlets 216. Upon orientation of valve assembly 200 in its open (unseated) position, as further explained hereinbelow, environmental intake fluid 217 will be allowed to exit housing 210 as outlet fluid 215 through outlet 218, and, in turn, through external outlet 219. As shown in FIG. 2, outlet 218 is sealed off by system poppet 220, which, in its closed (seated) position, prevents intake fluid 217 from exiting housing 210 through outlet 218. In the context of a gas lift valve, fluid 217 is typically a pressurized gas, and is used to aerate the oil being produced from an oil well. However, valve assembly 200 could be used in other contexts in which it is necessary to regulate the flow of fluids initially introduced under high pressures.

At proximal end 212 of housing 210, a pre-charge chamber 222 is disposed. Pre-charge chamber 222 includes first fixed end 224 and second movable end 226, on the back end of shaft flange 230. Pre-charge chamber 222 is filled with a predetermined amount of pressurized fluid, typically pressurized gas, using fluid input plug 228. The purpose of pre-charge chamber 222 is to set a threshold pressure which must be overcome in order to open system poppet 220, as will be explained further below. After pre-charge chamber 222 is filled with pressurized fluid, fluid input plug 228 is capped and sealed to prevent any pressurized fluid from escaping from pre-charge chamber 222.

Second movable end 226 of pre-charge chamber 222 is operably associated with shaft flange 230, which is itself coupled to shaft 232. Shaft 232 extends from shaft flange 230, through fixed fitting 234, all the way to system poppet 220. Fixed fitting 234 is operably connected to the elements that form housing 210. Shaft 232 also includes biasing spring 231 together with slot pin mechanism 237, which itself comprises slot 233 and pin 235. By preventing rotational or horizontal displacement of shaft component 239 relative to shaft 232, and ensuring the gradual, controlled-displacement of shaft 232, slot-pin mechanism 237 ensures the proper cooperation of shaft 232 with lower shaft component 239—and, in turn, with system poppet 220. At the same time, slot-pin mechanism 237 assists in distributing biasing force from shaft 232 to shaft component 239. Slot-pin mechanism 237 may comprise multiple slot-pin combinations spaced, for example, 120° apart. These and other functions of slot-pin mechanism 237 are described in U.S. application Ser. No. 13/900,114, assigned to Weatherford/Lamb, Inc., published as U.S. Pat. App. Pub. No. 2013/0312833 A1, which is incorporated herein by reference.

Figure 14:
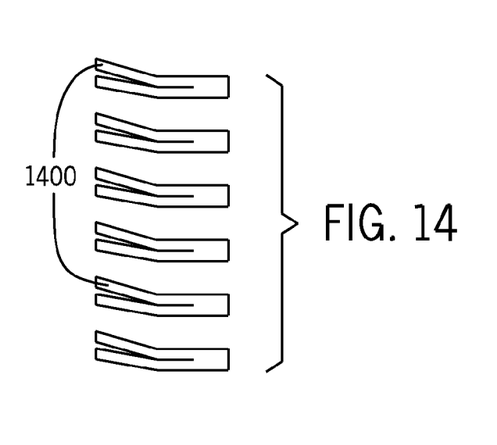
FIG. 14 is a cross-sectional view of a portion of an edge-welded bellows featuring rectangular internal weld beads, shown in an extended position.
Figure 15:
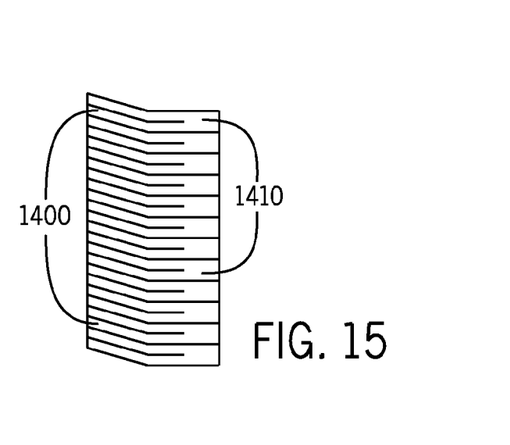
FIG. 15 is a cross-sectional view of a portion of the edge-welded bellows of FIG. 15, shown in a nested position.

In a preferred embodiment of the invention, bellows 236 is an edge-welded bellows, which is interposed between shaft flange 230 and fixed fitting 234, with bellows 236 having movable end 238 operably coupled to shaft flange 230. Bellows 236 also includes fixed end 240 coupled to fixed fitting 234. In this manner, with fixed end 240 being operably juxtaposed to fixed fitting 234, bellows 236 will expand when movable end 238 of bellows 236 moves towards proximal end 212 of housing 210. In another embodiment of the present invention, bellows 236 is a convoluted bellows. In a further embodiment, when bellows 236 is an edge-welded bellows, the weld beads of edge-welded bellows 236 are substantially rectangular in shape and positioned on the interior of the bellows, as shown in FIGS. 14-15. The benefits of such internal rectangular weld beads are discussed in further detail below.

In the operation of valve assembly 200, in order to open system poppet 220, a system operator (not shown), which system operator may be a human or computer operator, allows environmental intake fluid 217 to travel about housing 210 and to enter housing 210 through inlets 216. In the context of a gas lift valve, intake fluid 217 is typically a pressurized gas. Fluid 217 then travels from inlets 216 through access channels 242 towards proximal end 212 of housing 210, and into bellows 236. Access channels 242 may comprise a series of tubes or an annulus surrounding shaft 232. As fluid continues to enter bellows 236, the pressure in bellows 236 builds and the fluid in bellows 236 exerts a force against movable end 238 of bellows 236. When the internal pressure of bellows 236 reaches and exceeds the threshold pressure of pre-charge chamber 222, movable end 238 of bellows 236 pushes against shaft flange 230, and bellows 236 begins to expand. As a result, shaft flange 230 and shaft 232 move towards proximal end 212 of housing 210. Because shaft 232 is operably coupled to system poppet 220, the movement of shaft flange 230 and shaft 232 towards proximal end 212 of housing 210 causes system poppet 220 to likewise move towards proximal end 212 of housing 210, thereby opening system poppet 220. Once system poppet 220 is open, environmental intake fluid 217 entering inlets 216 can freely flow through outlet 218, and out external outlet 219.

In a full cycle of valve assembly 200, system poppet 220 can move from its closed position (as shown in FIG. 2) to its open position (not shown), and back to its closed position. The system operator can affirmatively stop the flow of intake fluid 217 outside housing 210, such that fluid 217 stops entering housing 210 at inlets 216. As a result, there will no longer be a continuous flow of fluid through access channels 242 and into bellows 236. At that point, the pressure built up in bellows 236 will begin to subside, while the constant pressure in pre-charge chamber 222 continues to exert a force against movable end 238 of bellows 236. When the internal pressure of bellows 236 falls below the threshold pressure of pre-charge chamber 222, movable end 226 of pre-charge chamber 222 will push against shaft flange 230, thereby moving shaft flange 230 and shaft 232 towards distal end 214 of housing 210. Again, with shaft 232 coupled to system poppet 220, the movement of shaft flange 230 and shaft 232 towards distal end 214 of housing 210 causes system poppet 220 to likewise move towards distal end 214 of housing 210, thereby closing system poppet 220 against outlet 218.

Figure 4:
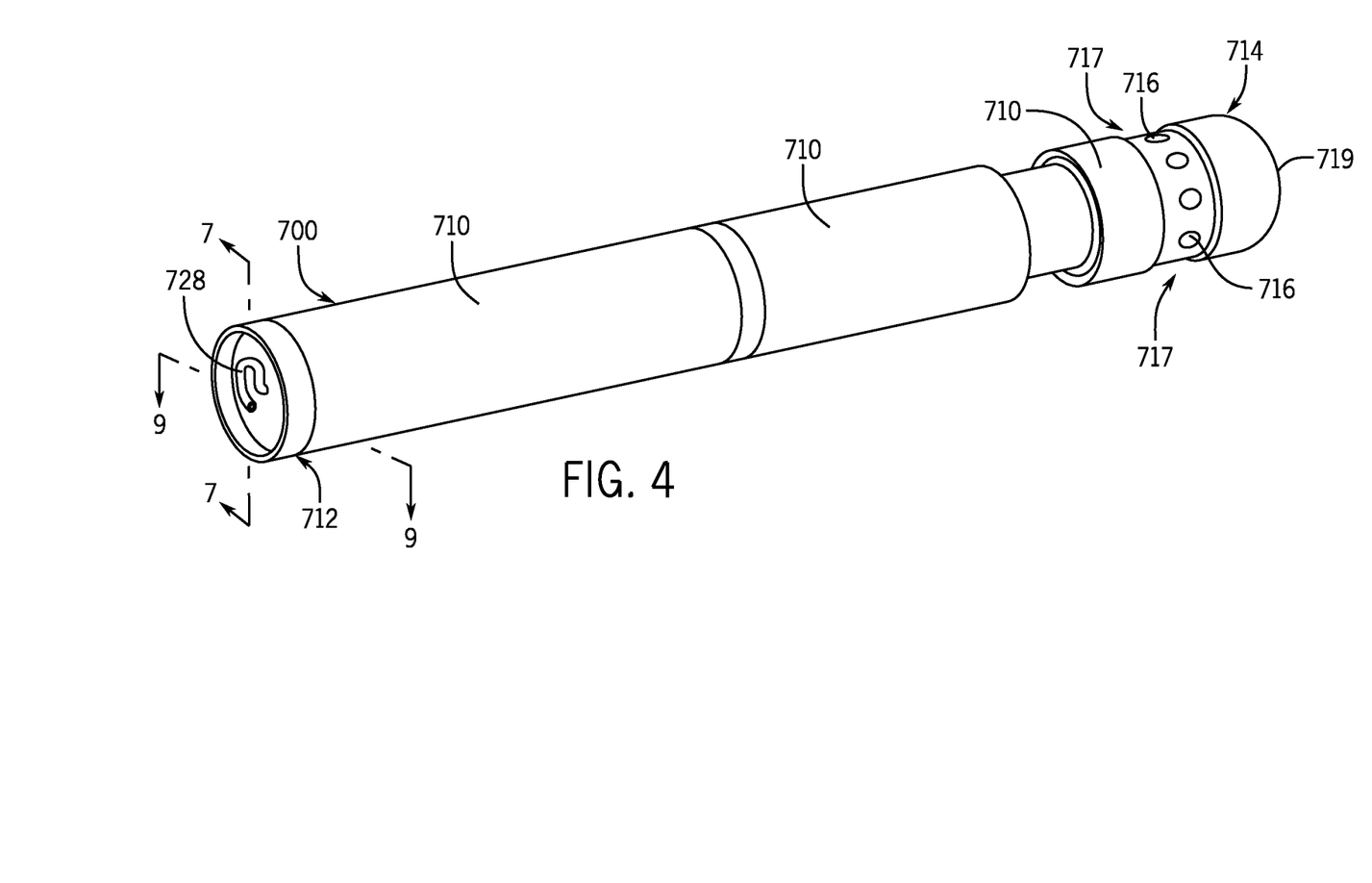
FIG. 4 is a perspective view of a high pressure valve assembly according to a second embodiment of the invention, in which two tandem bellows are utilized.

FIG. 4 depicts high pressure valve assembly 700 according to a second embodiment of the invention. High pressure valve assembly 700 comprises housing 710 having proximal end 712 and distal end 714. Housing 710 also includes a series of circumferential inlets 716, as well as external gas outlet 719.

Figure 5:
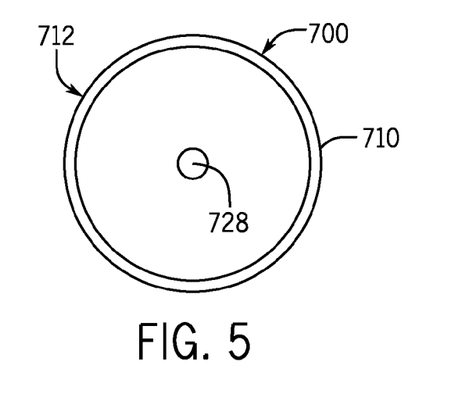
FIG. 5 is an elevated end view of the proximal end of the high pressure valve assembly of FIG. 4.
Figure 6:
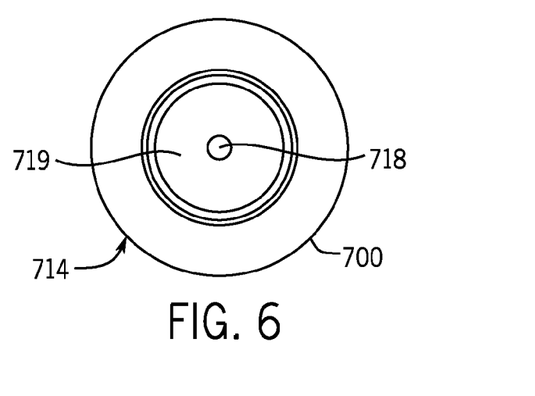
FIG. 6 is an elevated end view of the distal end of the high pressure valve assembly of FIG. 4.

Referring to FIG. 5, an elevated end view of proximal end 712 of housing 710 is shown. FIG. 5 also depicts pre-charge chamber fluid input plug 728, which provides the same function as fluid input plug 228 discussed above in the context of FIG. 2. FIG. 6 shows an elevated end view of distal end 714 of housing 700, showing outlet 718 and external outlet 719, through which fluid exits housing 700 when system poppet 720 is open. Notably, FIGS. 5 and 6 depict end views of the proximal end and the distal end of the housing for both embodiments. Thus, the elements referenced in FIGS. 5 and 6 apply equally to both high pressure valve assembly 200 and high pressure valve assembly 700.

Figure 7:
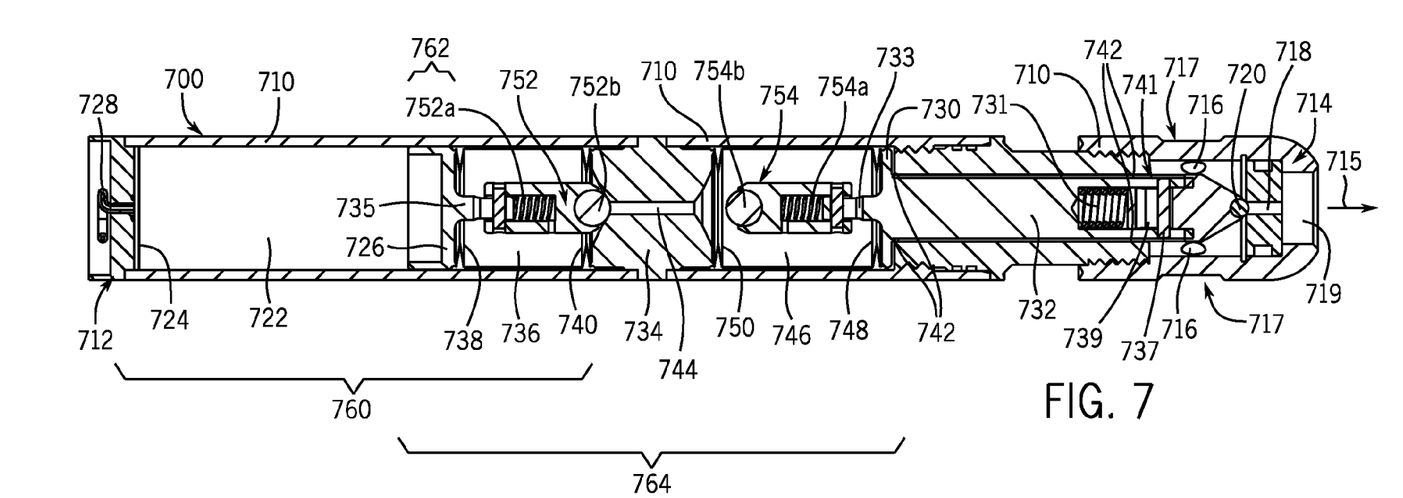
FIG. 7 is an elevated cross-sectional view of the high pressure valve assembly according to FIG. 4, taken along line 7-7 and looking in the direction of the arrows.
Figure 8:
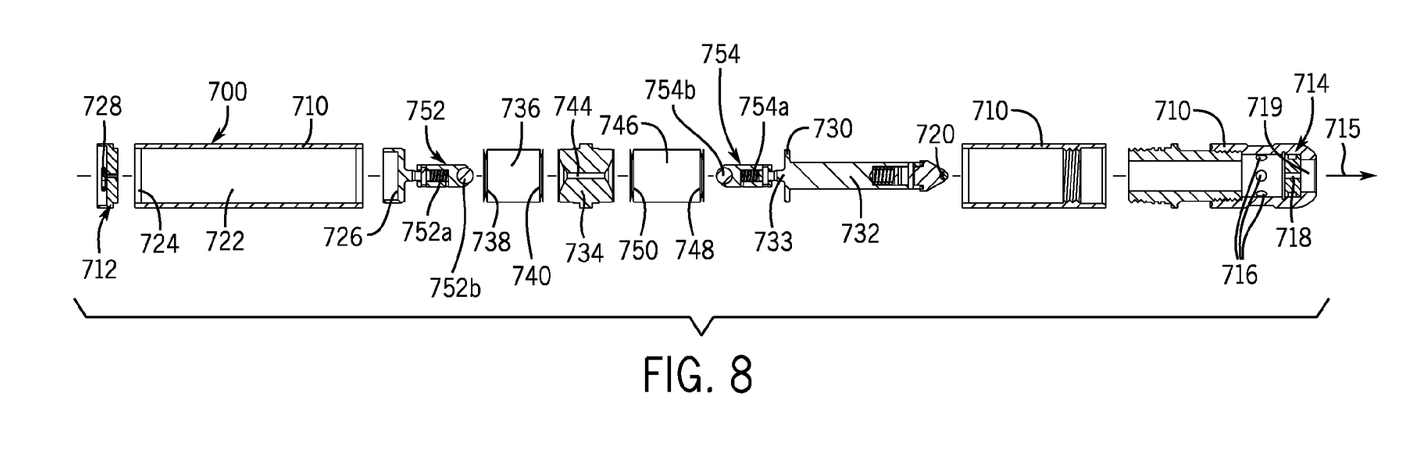
FIG. 8 is an exploded view of the high pressure valve assembly shown in FIG. 4.

Referring now to FIGS. 7 and 8, a cross-sectional view of high pressure valve assembly 700 is depicted. Valve assembly 700 comprises various elements that collectively form housing 710 having proximal end 712 and distal end 714. Valve assembly 700 is configured to regulate the flow of intake fluid 717 emanating from the environment outside of housing 710, which fluid 717 enters housing 710 through inlets 716. As further explained hereinbelow, intake fluid 717 will be allowed to exit housing 710 at outlet 718, and through external outlet 719 as outlet fluid 715. As shown in FIG. 7, outlet 718 is sealed off by system poppet 720, which prevents fluid from exiting housing 710 through outlet 718. In the context of a gas lift valve, intake fluid 717 is typically a pressurized gas, and is used to aerate the oil being produced from an oil well. However, valve assembly 700 could be used in other applications in which it is necessary to regulate the flow of fluids under high pressure.

At proximal end 712 of housing 710, pre-charge chamber 722 is disposed. Pre-charge chamber 722 comprises first fixed end 724 and second movable end 726. Pre-charge chamber 722 is filled with a predetermined amount of pressurized fluid, typically pressurized gas, using fluid input plug 728. The purpose of pre-charge chamber 722 is to set a threshold pressure which must be overcome in order to open system poppet 720, as will be explained further below. After pre-charge chamber 722 is filled with pressurized fluid, fluid input plug 728 is capped and sealed to prevent any pressurized fluid from escaping from pre-charge chamber 722.

In this preferred embodiment of the invention, first bellows 736 is operably coupled to pre-charge chamber 722 such that pre-charge chamber 722 and first bellows 736 collectively form a fixed system portion 760 on proximal side 712 of housing 710. Specifically, fixed system portion 760 is characterized on one side by first fixed end 724 of pre-charge chamber 722, and on the other side by fixed front end 740 of first bellows 736. On the inside of fixed system portion 760, movable barrier assembly 762 is formed by the interconnection of second movable end 726 of pre-charge chamber 722 and movable back end 738 of first bellows 736. Further, fixed end 740 of first bellows 736 is operably attached to fixed fitting 734, which is itself operably connected to the various elements that together form housing 710.

Second bellows 746 reciprocates conversely to first bellows 736. Second bellows 746 comprises movable front end 748 and fixed back end 750, which is operably attached to fixed fitting 734. In the same way that movable back end 738 of first bellows 736 is coupled to second movable end 726 of pre-charge chamber 722, movable front end 748 of second bellows 746 is coupled to shaft flange 730, which is itself operatively connected to shaft 732. Shaft 732 extends from shaft flange 730 to system poppet 720. In this manner, the dual bellows structure comprised of first bellows 736 and second bellows 746 form movable system 764 on the inside of housing 710. Specifically, movable system 764 is characterized on one side by the attached combination of movable back end 738 of first bellows 736 and second movable end 726 of pre-charge chamber 722, and on the other side by the attached combination of movable front end 748 of second bellows 746 and shaft flange 730. Within movable system 764, fixed fitting 734 maintains its position at all times, regardless of the movement of either bellows. Moreover, fixed fitting 734 comprises fluid passage 744, which hydraulically connects first bellows 736 and second bellows 746.

As a result of this configuration, the variable interior of first bellows 736, the fixed interior of fluid passage 744 and variable interior of second bellows 746 collectively form a variable, reciprocating sealed dual bellows chamber. Once construction of this sealed dual bellows chamber is complete, first bellows 736, second bellows 746 and fluid passage 744 are filled with an incompressible fluid, such as silicone oil. Depending on which bellows is being compressed, the incompressible fluid can flow from first bellows 736 to second bellows 746 through fluid passage 744 or vice versa, as the flow of the incompressible fluid reciprocates.

First bellows 736 includes first limiting valve 752, which comprises biasing spring 752a and valve ball 752b, while second bellows 746 includes second limiting valve 754, which itself includes biasing spring 754a and valve ball 754b. Each of limiting valves 752, 754 serve important purposes. First, the length of limiting valve 752 coupled with the length of pre-charge extension 735, define the distance between the sealing end of limiting valve ball 752b and movable back end 738 of first bellows 736—to establish a predetermined length, in which valve ball 752b is seated and sealed against fixed fitting 734. First bellows 736 is incapable of being completely compressed to a fully-nested bellows orientation. In the same way, limiting valve 754, coupled with the length of shaft extension 733, sets a length to which second bellows 746 can be compressed. Second bellows 746 is likewise incapable of being compressed beyond that length due to valve ball 754b being seated and sealed against fixed fitting 734. Once valve ball 754b is so seated and sealed, becomes incapable of being further compressed towards a fully-nested bellows orientation. As a result, each of first and second bellows 736, 746 can be alternatively compressed until first and second limiting valves 752, 754 prevent further compression, respectively. First and second bellows 736, 746 remain in alternating predetermined states of partial compression, a state hereinafter described as "preset partially-compressed." First and second bellows 736, 746 are not compressed at the same time. Rather, first bellows 736 is compressed when second bellows 746 is expanded, and vice versa.

Upon preventing the full compression of first bellows 736, limiting valve 752 further serves to prevent the complete evacuation of incompressible fluid from preset partially-compressed first bellows 736. Limiting valve 754 likewise prevents the complete evacuation of incompressible fluid from preset partially-compressed second bellows 746 As a result, the preset partially-compressed bellows (in the case of either first bellows 736 or second bellows 746) remain filled with incompressible fluid. This retention of incompressible fluid within at least two tandem bellows serves to minimize any differential pressures across the surfaces of the bellows, thereby enabling the bellows to withstand immense pressures.

Figure 13:
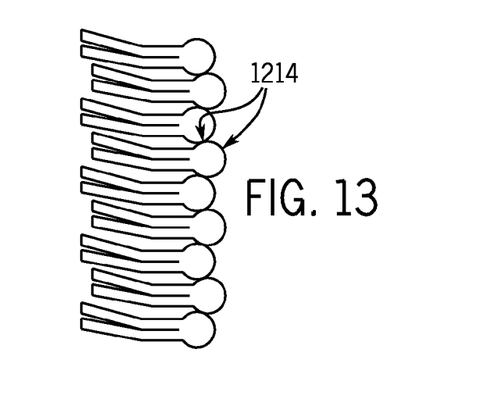
FIG. 13 is a cross-sectional view of the portion of a standard edge-welded bellows of FIG. 12 shown in a nested position.

By way of example, by maintaining preset partially-compressed first bellows 736 full of incompressible fluid, the pressure exerted against movable back end 738 of first bellows 736 by the incompressible fluid, is substantially equal to the pressure exerted by the pressurized fluid contained in pre-charge chamber 722 against second movable end 726 of pre-charge chamber 722. As a result, the differential pressure across movable barrier assembly 762 is very low—on the order of pounds-per-square-inch in the low single digits. As noted above, high differential pressures across the surface of a bellows can cause bellows failure. With a reduction in the differential pressure across movable back end 738 of first bellows 736 relative to second movable end 726 of pre-charge chamber 722, limiting valve 752 likewise minimizes this risk of bellows failure by ensuring that first bellows 736 is not permitted to collapse to its fully-nested, fluid-emptying, unbalanced orientation, such as as shown in FIG. 13. As a result also, it is believed that first bellows 736 will be capable of withstanding pressures of 10,000 psi or greater, with at least 10,000 cycles attributable to valve assembly 700. These benefits likewise apply to limiting valve 754, which minimizes the differential pressure across movable front end 748 of second bellows 746 and shaft flange 730.

Figure 9:
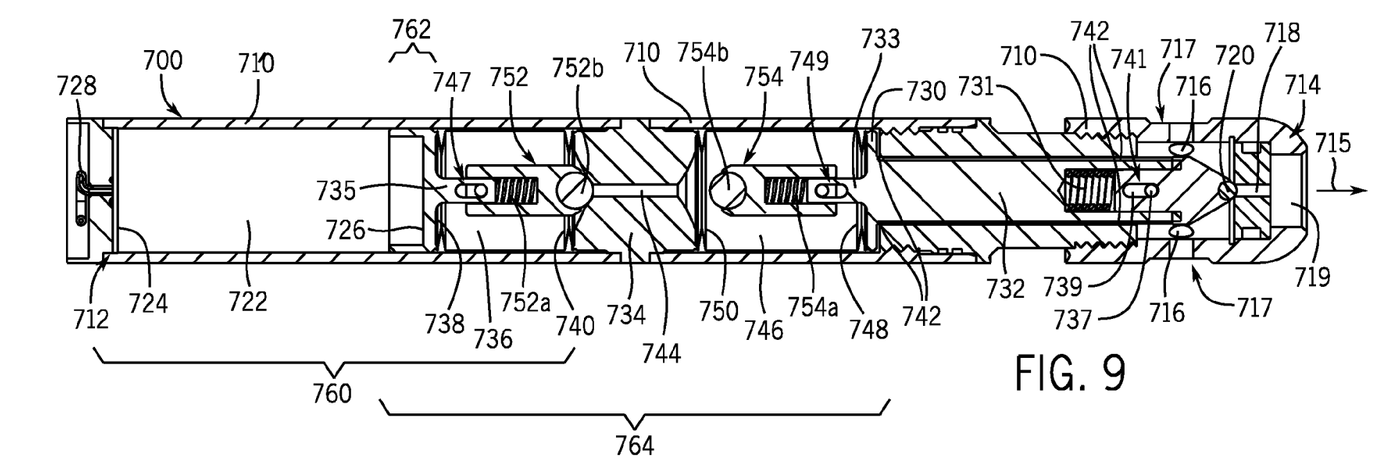
FIG. 9 is an elevated cross-sectional view of the high pressure valve assembly shown in FIG. 4, taken along line 9-9 and looking in the direction of the arrows, in which the system poppet is shown seated in its fully closed position.
Figure 10:
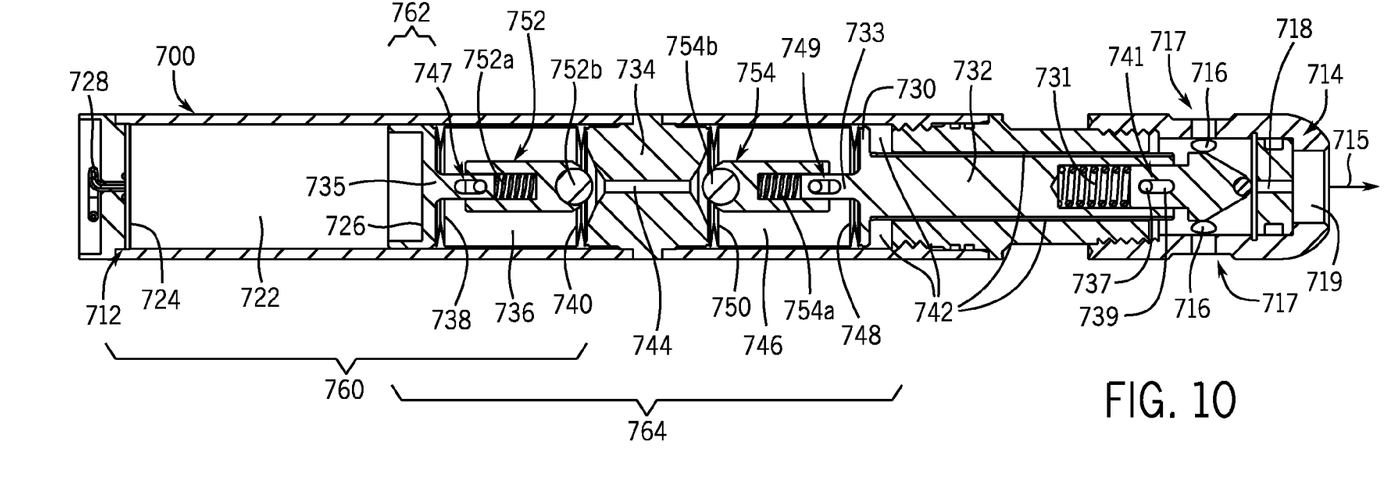
FIG. 10 is an elevated cross-sectional view of the high pressure valve assembly shown in FIG. 4, taken along line 9-9 and looking in the direction of the arrows, in which the system poppet has been partially opened as a result of the introduction of gas through the gas inlets proximate to the system poppet.
Figure 11:
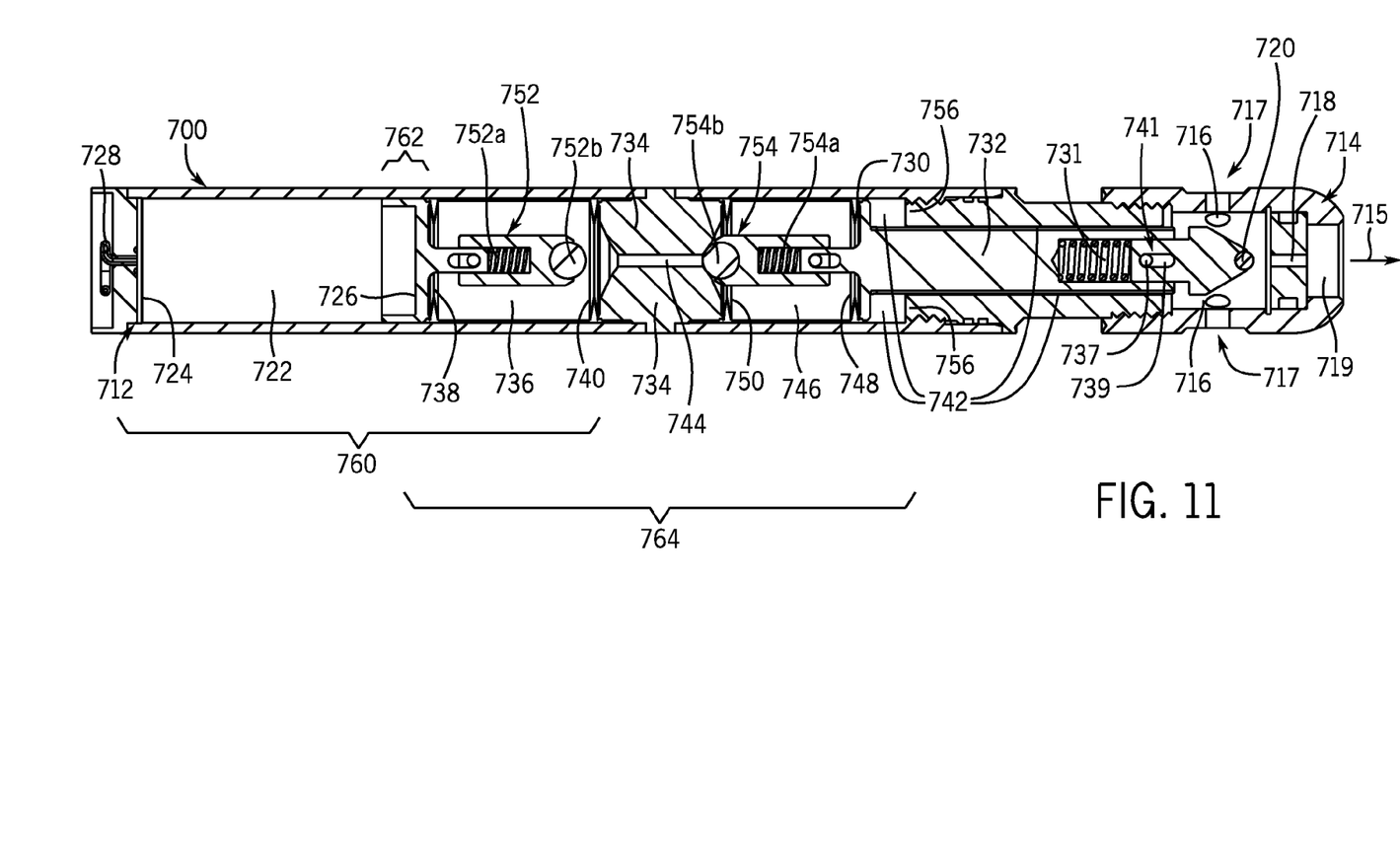
FIG. 11 is an elevated cross-sectional view of the high pressure valve assembly shown in FIG. 4, taken along line 9-9 and looking in the direction of the arrows, in which the system poppet is fully opened, to permit the release of gas through the outlet proximate to the system poppet.

The full operation of valve assembly 700 is collectively shown in FIGS. 9-11. Specifically, FIG. 9 depicts valve assembly 700 in its "starting," fully-closed position, in which first bellows 736 is in its preset partially-compressed state, and system poppet 720 is fully seated against outlet 718, thereby preventing any fluid from exiting housing 710 through outlet 718. In FIG. 9 also, slot-pin mechanism 741 comprising pin 737 and slot 739—performs the same functions as slot-pin mechanism 237, described above with respect to FIG. 2. Similarly, slot-pin mechanism 747 of first limiting valve 752 and slot-pin mechanism 749 of second limiting valve 754 assist in the proper orientation and compression of limiting valves 752, 754. FIG. 10 depicts valve assembly 700 in an "opening" position, in which shaft 732 and system poppet 720 are moving towards proximal end 712 of housing 710. FIG. 11 depicts valve assembly 700 in its fully-open position, in which second bellows 746 is in its preset partially-compressed state, in which system poppet 720 is fully extended away from outlet 718, thereby enabling fluid to exit housing 710 through outlet 718. The operation of valve assembly 700 between the various states depicted in FIGS. 9, 10 and 11, respectively, and then back to the state depicted in FIG. 9 represents a single cycle of valve assembly 700. Each step of the operation is explained in further detail below.

In the initial state of valve assembly 700, pre-charge chamber 722 has been pressurized, capped and sealed, thereby setting a threshold pressure, with the pre-charge chamber being "extended" such that second movable end 726 is disposed at its greatest distance from first fixed end 724. This extended state of pre-charge chamber 722 exerts a force against movable back end 738 of first bellows 736, thereby setting first bellows 736 in its preset partially-compressed state. In that state, preset partially-compressed first bellows 736 is substantially filled with incompressible fluid, and limiting valve 752 is seated against fluid passage 744, thereby preventing any incompressible fluid within first bellows 736 from flowing through fluid passage 744 and into second bellows 746. With first bellows 736 in its preset partially-compressed state and substantially filled with incompressible fluid, the differential pressure across movable barrier assembly 762 is nearly zero.

In this same orientation, second bellows 746—also full of incompressible fluid—is in its extended state, with limiting valve 754 at its farthest distance from fluid passage 744. With second bellows 746 extended, shaft flange 730 is fully extended toward the distal end 714 of housing 710. As a result, system poppet 720 is fully seated against outlet 718, and system poppet 720 prevents any environmental intake fluid 717 from exiting housing 710 through outlet 718.

To begin the process by which system poppet 720 opens to release outlet fluid 715 into a desired environment, a system operator (not shown) allows fluid to travel outside housing 710 to enter housing 710 through a series of circumferential inlets 716. Again, in the context of a gas lift valve, the fluid is typically a pressurized gas. Fluid then travels from inlets 716 through access channels 742 towards proximal end 712 of housing 710, and exerts a force against shaft flange 730 and second bellows 746, specifically, against the surface of shaft flange 730 facing distal end 714 of housing 710. Access channels 742 may comprise a series of tubes, or an annulus surrounding shaft 732. Notably, fluid that enters housing 710 travels not only through access channels 742 to shaft flange 730, it can also surround second bellows 746 to exert pressure against the sides of second bellows 746 positioned longitudinally in housing 710. In the same way, the pressurized fluid within pre-charge chamber 722 can likewise surround first bellows 736 to exert pressure against the sides of first bellows 736 positioned longitudinally in housing 710.

As fluid continues to enter housing 710, the fluid pressure begins to build against shaft flange 730 and second bellows 746. Once the fluid pressure against shaft flange 730 and second bellows 746 reaches and exceeds the threshold value set within the pre-charge chamber, the internal movement of valve assembly 700 is depicted in FIG. 10, in which system poppet 720 is beginning to open. In this state, sufficient pressure has built up against shaft flange 730 and second bellows 746 to push shaft flange 730 away from internal housing portion 756, thereby expanding the volume of space that forms access channels 742. This movement of shaft flange 730 towards proximal end 712 of housing 710 begins to compress second bellows 746, thereby forcing incompressible fluid from second bellows 746 into fluid passage 744, to exert a force against limiting valve 752. As a result, limiting valve 752 opens, and incompressible fluid flows freely from second bellows 746, through fluid passage 744, and into first bellows 736. The additional incompressible fluid in first bellows 736 causes first bellows 736 to begin expanding, by exerting a force against movable back end 738 of first bellows 736. As the pressure within first bellows 736 increases, movable back end 738 exerts a force against second movable end 726. As a result, movable barrier assembly 762 moves towards proximal end 712 of housing 710.

While described sequentially herein, movable barrier assembly 762 moves contemporaneously with the combination of shaft flange 730 and movable front end 748 of second bellows 746. Thus, movable system 764 in its entirety moves towards proximal end 712 of housing 710. In turn, shaft 732 moves towards proximal end 712 of housing 710 until system poppet 720 opens and allows the fluid entering housing 710 through inlets 716 to exit housing 710 through outlet 718 and external outlet 719.

As pressure continues to build, the movement of movable barrier assembly 762 towards proximal end 712 of housing 710 continues until valve assembly 700 reaches the state depicted in FIG. 11. In FIG. 11, system poppet 720 is disposed at its greatest distance from outlet 718 and distal end 714 of housing 710. In turn, the fluid entering inlets 716 has built up enough pressure in access channels 742 to create a significant volume of space between shaft flange 730 and internal housing portion 756. As a result, second bellows 746 is in its preset partially-compressed state, with limiting valve 754 preventing any further compression of second bellows 746, and also preventing the evacuation of any further incompressible fluid from second bellows 746 through fluid passage 744 and into first bellows 736. In this state, the pressure exerted by fluid within access channels 742 against shaft flange 730 is substantially equal to the pressure exerted by the incompressible fluid contained within second bellows 746 against movable front end 748. Therefore, the differential pressure across shaft flange 730 and second bellows 746 is, again, nearly zero, minimizing the risk of bellows failure.

As shown in FIG. 11, the preset partially-compressed second bellows 746, at its compressed limit due to limiting valve 754, results in the expansion of first bellows 736. Specifically, movable back end 738 of first bellows 736 exerts a force against second movable end 726 of pre-charge chamber 722, which results in movable barrier assembly 762 being disposed in its position closest to proximal end 712 of housing 710. Moreover, the pressure exerted by the pressurized fluid within pre-charge chamber 722 against second movable end 726 is substantially equal to the pressure exerted by the incompressible fluid contained within first bellows 736 against movable back end 738. Therefore, the differential pressure across movable barrier assembly 762 and first bellows 736 is nearly zero, minimizing the risk of bellows failure.

To return valve assembly 700 to its closed position, as shown in FIG. 9, the system operator can affirmatively stop the flow of intake fluid 717 outside housing 710, such that less, or lower pressure, intake fluid 717 stops entering housing 710 at inlets 716. As a result, there will no longer be a continuous high pressure flow of intake fluid 717 through access channels 742, and the pressure of such intake fluid 717 against shaft flange 730 will begin to subside. Again, since pre-charge chamber 722 exerts a constant pressure against movable system 764, once the fluid pressure against shaft flange 732 falls below the threshold pressure set by pre-charge chamber 722, movable system 764 will begin moving towards distal end 714 of housing 710. Specifically, the pressure against second movable end 726 of pre-charge chamber 722 begins to compress first bellows 736, thereby forcing incompressible fluid from first bellows 736 back into fluid passage 744, to exert a force against limiting valve 754. As a result, limiting valve 754 opens, and incompressible fluid flows from first bellows 736, through fluid passage 744, and into second bellows 746. The additional incompressible fluid in second bellows 746 causes second bellows 746 to begin expanding, by exerting a force against movable front end 748 of second bellows 746. As the pressure within second bellows 746 grows, movable front end 748 exerts a force against shaft flange 730. As a result, the attached shaft flange 730 and movable front end 748 move towards distal end 714 of housing 710, towards closing system poppet 720 to seal and seat against outlet 718.

Again, though described sequentially herein, movable barrier assembly 762 moves contemporaneously with the combination of shaft flange 730 and movable front end 748 of second bellows 746. Thus, movable system 764 in its entirety moves towards distal end 714 of housing 710. In turn, shaft 732 moves towards distal end 714 of housing 710 until system poppet 720 closes and seals against outlet 718, thereby preventing any fluid from exiting housing 710 through outlet 718.

Figure 12:
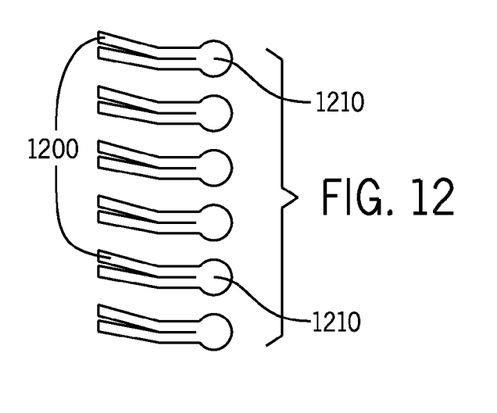
FIG. 12 is a cross-sectional view of a portion of a standard edge-welded bellows featuring spherical weld beads, shown in an extended position.

As noted above, neither first bellows 736 nor second bellows 746 in valve assembly 700 ever reach full compression. However, if either of these bellows were to fail—if, for example, limiting valve 754 were to break—then the bellows may be forced into a fully compressed position. As shown in FIGS. 12 and 13, a standard edge-welded bellows (not fully shown) consists of bellow plates 1200 having circular weld beads 1210 at each welding location. When the bellows is extended, as shown in FIG. 12, circular weld beads 1200 function normally. However, when the bellows is fully compressed under a relatively high pressure on the order of 1,000 psi, circular weld beads 1210 will be compacted together. Due to their circular shape, the arcs 1214 of each adjacent weld bead could shear, creating an imperfect alignment, resulting in the displaced configuration shown in FIG. 13. Unlimited shearing can lead to further failure of the bellows, which could result in a leak of the incompressible fluid contained therein.

One method for increasing the overall strength and integrity of an edge-welded bellows is to weld the plates together such that the weld beads are substantially rectangular in shape. In FIG. 14, the edge-welded bellows (not fully shown) consists of bellows plates 1400 having rectangular, internal weld beads 1410. When such a bellows is compressed in its fully nested position, as shown in FIG. 15, rectangular weld beads 1410 stack neatly on top of one another. Thus, when nested, a bellows having rectangular weld beads 1410 forms a solid, self-supporting cylindrical stack, capable of withstanding much higher pressures than the standard bellows shown in FIGS. 12 and 13. Thus, in the event of bellows failure, rectangular weld beads 1410 serve to minimize the risk of an incompressible fluid leak. Such bellows having rectangular weld beads are available from Senior Aerospace Metal Bellows corporation of Sharon, Mass., and are sold under the trademark HIPRES®, which trademark is owned by the assignee of the present application. Further, in a preferred embodiment of the invention, the bellows could be formed from an INCONEL® alloy, such as INCONEL® alloy 625 or INCONEL® alloy 718, or from AM 350®, stainless steel or titanium. INCONEL® alloy is a registered trademark of Huntington Alloys Corporation, and AM 350® is a registered trademark of ATI Properties, Inc.

The foregoing description and drawings merely explain and illustrate the invention, and the invention is not so limited, as those skilled in the art who have the disclosure before them will be able to make modifications and variations therein without departing from the scope of the invention.

We claim:

1. A high pressure valve assembly comprising:
a housing having a proximal end and a distal end;
a pre-charge chamber having a first fixed end disposed adjacent said proximal end and a second movable end opposite said first fixed end,
a first bellows having a movable back end operably coupled to said second movable end of said pre-charge chamber and a fixed front end opposite said movable back end, said fixed front end being operably coupled to a fixed fitting restrainably affixed along the interior of said housing;
a second bellows having a fixed back end operably coupled to said fixed fitting, and a movable front end opposite said fixed back end;
a shaft flange operably connected to the movable front end of said second bellows, said shaft flange being coupled by a shaft to a system poppet configured to seal an outlet in said distal end of said housing;
at least one inlet disposed adjacent said distal end of said housing, said at least one inlet enabling a pressurized intake gas to enter said housing and flow through one or more access channels to exert a pressure against said shaft flange, and, in turn, said movable front end of said second bellows; and
a fluid passage disposed within said fixed fitting, said fluid passage operably connecting said first bellows and said second bellows to form a sealed dual bellows chamber defined by said first bellows, said second bellows and said fluid passage,
wherein said first bellows includes a first limiting valve that serves to seal said fluid passage when said first bellows is compressed, and
wherein said second bellows includes a second limiting valve that serves to seal said fluid passage when said second bellows is compressed.

2. The high pressure valve assembly according to claim 1, wherein said first limiting valve limits the compression of said first bellows to a first pre-determined orientation in which said first bellows is not fully nested.

3. The high pressure valve assembly according to claim 2, wherein said first limiting valve includes a coiled spring and a slot pin mechanism.

4. The high pressure valve assembly according to claim 1, wherein said second limiting valve limits the compression of said second bellows to a second pre-determined orientation in which said second bellows is not fully nested.

5. The high pressure valve assembly according to claim 1, wherein said second limiting valve includes a coiled spring and a slot pin mechanism.

6. The high pressure valve assembly according to claim 1, wherein said sealed dual bellows chamber is substantially filled with a substantially incompressible fluid.

7. The high pressure valve assembly according to claim 6, wherein said pre-charge chamber contains a pressurized pre-charge gas set at a threshold pressure value.

8. The high pressure valve assembly according to claim 7, wherein said pressurized pre-charge gas exerts a compression force against said first bellows, thereby forcing an amount of said incompressible fluid into said second bellows to, in turn, expand said second bellows.

9. The high pressure valve assembly according to claim 1, wherein said movable front end of said second bellows expands towards said distal end of said housing to, in turn, move both said shaft flange and said shaft towards said distal end of said housing, thereby closing and sealing said system poppet.

10. The high pressure valve assembly according to claim 6, wherein said first limiting valve of said first bellows prevents the complete evacuation of said incompressible fluid from said first bellows.

11. The high pressure valve assembly according to claim 7, wherein the incompressible fluid remaining in said first bellows exerts a first fluid pressure against said second movable end of said pre-charge chamber, said first fluid pressure being substantially equal to said threshold pressure value.

12. The high pressure valve assembly according to claim 7, wherein said second bellows expands when a gas pressure of said pressurized intake gas against said shaft flange falls below said threshold pressure value of said pre-charge chamber.

13. The high pressure valve assembly according to claim 6, wherein the compression of said second bellows opens said first limiting valve and forces an amount of said incompressible fluid into said first bellows, thereby expanding said first bellows by pushing said movable back end of said first bellows towards said proximal end of said housing to, in turn, move both said shaft flange and said shaft towards said proximal end of said housing, thereby opening said system poppet and allowing said pressurized intake gas to exit said housing through said outlet.

14. The high pressure valve assembly according to claim 6, wherein said second limiting valve of said second bellows prevents the complete evacuation of said incompressible fluid from said second bellows.

15. The high pressure valve assembly according to claim 12, wherein the incompressible fluid remaining in said second bellows exerts a second fluid pressure against said movable front end of said second bellows, said second fluid pressure being substantially equal to said gas pressure of said pressurized intake gas.

16. The high pressure valve assembly according to claim 1, wherein said movable front end of said second bellows expands towards said distal end of said housing to, in turn, move both said shaft flange and said shaft towards said distal end of said housing, thereby closing and sealing said system poppet.

17. A dual bellows assembly for high pressure valve applications, said dual bellows assembly comprising: a housing defining an interior; a first bellows having a movable back end and a fixed front end opposite said movable back end, said fixed front end being operably coupled to a fixed fitting restrainably affixed along the interior of said housing; a second bellows having a fixed back end operably coupled to said fixed fitting, and a movable front end opposite said fixed back end; a fluid passage disposed within said fixed fitting, said fluid passage operably connecting said first bellows and said second bellows to form a sealed dual bellows chamber defined by said first bellows, said second bellows and said fluid passage, wherein said first bellows includes a first limiting valve that serves to seal said fluid passage when said first bellows is compressed, and wherein said second bellows includes a second limiting valve that serves to seal said fluid passage when said second bellows is compressed.

18. The dual bellows assembly for high pressure valve applications according to claim 17, wherein said sealed dual bellows chamber is substantially filled with an incompressible fluid.

19. A gas lift valve comprising:
a housing having a proximal end and a distal end;
a pre-charge chamber having a first fixed end disposed adjacent said proximal end and a second movable end opposite said first fixed end, said pre-charge chamber containing a pressurized pre-charge gas set at a threshold pressure value;
a first bellows having a movable back end operably coupled to said second movable end of said pre-charge chamber and a fixed front end opposite said movable back end, said fixed front end being operably coupled to a fixed fitting restrainably affixed along the interior of said housing;
a second bellows having a fixed back end operably coupled to said fixed fitting, and a movable front end opposite said fixed back end;
a shaft flange operably connected to the movable front end of said second bellows, said shaft flange being coupled by a shaft to a system poppet configured to seal an outlet in said distal end of said housing;
at least one inlet disposed adjacent said distal end of said housing, said at least one inlet enabling a pressurized intake gas to enter said housing and flow through one or more access channels to exert a pressure against said shaft flange, and, in turn, said movable front end of said second bellows; and
a fluid passage disposed within said fixed fitting, said fluid passage operably connecting said first bellows and said second bellows to form a sealed dual bellows chamber defined by said first bellows, said second bellows and said fluid passage,
wherein said first bellows includes a first limiting valve that serves to seal said fluid passage when said first bellows is compressed, and
wherein said second bellows includes a second limiting valve that serves to seal said fluid passage when said second bellows is compressed.

\* \* \* \* \*